(12) United States Patent
Hori

(10) Patent No.: US 8,919,470 B2
(45) Date of Patent: Dec. 30, 2014

(54) GRILLE SHUTTER DEVICE

(71) Applicant: Aisin Seiki Kabushiki Kaisha, Kariya (JP)

(72) Inventor: Kenji Hori, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 69 days.

(21) Appl. No.: 13/630,298

(22) Filed: Sep. 28, 2012

(65) Prior Publication Data

US 2013/0075172 A1    Mar. 28, 2013

(30) Foreign Application Priority Data

Sep. 28, 2011    (JP) .................................. 2011-212662

(51) Int. Cl.
*B60K 11/08*    (2006.01)

(52) U.S. Cl.
CPC .................................... *B60K 11/085* (2013.01)
USPC ......................................... 180/68.1; 180/68.3

(58) Field of Classification Search
CPC ............................... B60K 11/085; B60K 13/02
USPC ................................................ 180/68.1, 68.3
See application file for complete search history.

(56) References Cited

U.S. PATENT DOCUMENTS

| | | | | |
|---|---|---|---|---|
| 2,217,302 A * | 10/1940 | Agerell et al. ............... | 180/68.1 |
| 4,753,288 A * | 6/1988 | Harvey ............................ | 165/98 |
| 6,854,544 B2 * | 2/2005 | Vide ............................. | 180/68.6 |
| 8,056,946 B2 * | 11/2011 | Bernt et al. .................... | 293/102 |
| 8,091,668 B2 * | 1/2012 | Amano et al. ................. | 180/68.1 |
| 8,118,087 B2 * | 2/2012 | Saida et al. .................... | 165/202 |
| 8,128,153 B2 * | 3/2012 | Bernt et al. .............. | 296/187.04 |
| 8,181,727 B2 * | 5/2012 | Ritz et al. ..................... | 180/68.1 |
| 8,281,754 B2 * | 10/2012 | Saida et al. ................ | 123/41.04 |
| 8,292,014 B2 * | 10/2012 | Sugiyama ..................... | 180/68.1 |
| 8,443,921 B2 * | 5/2013 | Charnesky et al. .......... | 180/68.1 |
| 8,469,128 B2 * | 6/2013 | Van Buren et al. .......... | 180/68.1 |
| 8,473,164 B2 * | 6/2013 | Charnesky et al. ............. | 701/49 |
| 8,485,296 B2 * | 7/2013 | Charnesky et al. .......... | 180/68.1 |
| 8,505,660 B2 * | 8/2013 | Fenchak et al. .............. | 180/68.1 |
| 8,517,130 B2 * | 8/2013 | Sakai ............................ | 180/68.1 |

(Continued)

FOREIGN PATENT DOCUMENTS

| | | |
|---|---|---|
| GB | 2 131 150 A | 6/1984 |
| JP | 58-139519 U | 9/1983 |
| JP | 2007 320527 A | 12/2007 |

OTHER PUBLICATIONS

Extended European Search Report dated Feb. 6, 2013, issued by European Patent Office in corresponding European Patent Application No. 12186440.9. (6 pages).

*Primary Examiner* — Jeffrey J Restifo

(74) *Attorney, Agent, or Firm* — Buchanan Ingersoll & Rooney PC

(57) ABSTRACT

A grille shutter device adapted to be arranged at a front portion of a vehicle body, the grille shutter device including a main air inlet taking air to flow the air to a specific heat exchanger arranged in the vehicle body, a shutter mechanism arranged at the main air inlet, the shutter mechanism opening and closing to control a flow rate of the air flowing from the main air inlet to the specific heat exchanger, and a bypass air inlet allowing the air to bypass the shutter mechanism to guide the air to the specific heat exchanger.

18 Claims, 8 Drawing Sheets

(56) References Cited

U.S. PATENT DOCUMENTS

| | | | |
|---|---|---|---|
| 8,561,738 B2 * | 10/2013 | Charnesky et al. | 180/68.1 |
| 8,561,739 B2 * | 10/2013 | Hori | 180/68.1 |
| 8,627,911 B2 * | 1/2014 | Tregnago et al. | 180/68.1 |
| 8,631,889 B2 * | 1/2014 | Begleiter et al. | 180/68.1 |
| 8,645,028 B2 * | 2/2014 | Mochizuki | 701/49 |
| 8,646,552 B2 * | 2/2014 | Evans et al. | 180/68.1 |
| 8,662,569 B2 * | 3/2014 | Klop | 296/193.1 |
| 8,667,931 B2 * | 3/2014 | Kerns | 123/41.05 |
| 2006/0211364 A1 | 9/2006 | Brotz et al. | |
| 2011/0001325 A1 * | 1/2011 | Bernt et al. | 293/155 |
| 2011/0061405 A1 * | 3/2011 | Watanabe et al. | 62/61 |
| 2011/0097984 A1 * | 4/2011 | Hasegawa et al. | 454/152 |
| 2011/0181062 A1 * | 7/2011 | Bernt et al. | 293/102 |
| 2011/0203861 A1 * | 8/2011 | Charnesky et al. | 180/68.1 |
| 2011/0297468 A1 * | 12/2011 | Coel et al. | 180/68.1 |
| 2012/0012410 A1 | 1/2012 | Hori | |
| 2012/0090906 A1 * | 4/2012 | Charnesky et al. | 180/68.1 |
| 2012/0186890 A1 | 7/2012 | Hori et al. | |
| 2012/0270490 A1 * | 10/2012 | Turner et al. | 454/75 |
| 2012/0305818 A1 * | 12/2012 | Charnesky et al. | 251/212 |
| 2013/0036991 A1 * | 2/2013 | Kerns | 123/41.04 |
| 2013/0068403 A1 * | 3/2013 | Fenchak et al. | 160/218 |
| 2013/0075172 A1 * | 3/2013 | Hori | 180/68.1 |
| 2013/0081785 A1 * | 4/2013 | Yoo | 165/96 |
| 2013/0092462 A1 * | 4/2013 | Chinta | 180/68.1 |
| 2013/0095740 A1 * | 4/2013 | Hori | 454/152 |
| 2013/0103265 A1 * | 4/2013 | Remy et al. | 701/49 |
| 2013/0126253 A1 * | 5/2013 | Saito et al. | 180/68.1 |
| 2013/0184943 A1 * | 7/2013 | Sato et al. | 701/49 |
| 2013/0220577 A1 * | 8/2013 | Bignon et al. | 165/98 |
| 2013/0248266 A1 * | 9/2013 | Asano et al. | 180/68.1 |
| 2013/0252531 A1 * | 9/2013 | Asano et al. | 454/155 |
| 2013/0268164 A1 * | 10/2013 | Sugiyama | 701/49 |

* cited by examiner

US 8,919,470 B2

GRILLE SHUTTER DEVICE

CROSS REFERENCE TO RELATED APPLICATIONS

This application is based on and claims priority under 35 U.S.C. §119 to Japanese Patent Application 2011-212662, filed on Sep. 28, 2011, the entire content of which is incorporated herein by reference.

TECHNICAL FIELD

This disclosure generally relates to a grille shutter device.

BACKGROUND DISCUSSION

A known grille shutter device disclosed in JP58-139519U (which will be hereinafter referred to as Reference 1) may control a flow rate of air flowing from a grille opening portion into an engine compartment, in accordance with opening and closing operations of a shutter mechanism provided at the grille opening portion arranged at a front portion of a vehicle body.

In other words, according to the grille shutter device disclosed in Reference 1, the shutter mechanism is brought in a closed state, for example, while a vehicle is moving at high speed; thereby, the flow rate of the air taken into the engine compartment is restricted. Therefore, aerodynamic performance of the vehicle may be increased (for example, a "Cd value" that is a value for coefficient of drag may be decreased). Meanwhile, according to the grille shutter device of Reference 1, a flow rate of air taken into a radiator is restricted when an engine is started; thereby, a period of time to warm up the engine may be reduced. In addition, according to the grille shutter device of Reference 1, for example, in a case where a temperature of the engine tends to rise, the shutter mechanism is brought in an opened state to thereby increase the flow rate of the air flowing into the engine compartment. Therefore, the temperature of the engine may be appropriately controlled.

In general, various heat exchangers (for example, a condenser for an air conditioner) are provided in an engine compartment. Air flowing from a grille opening portion to the engine compartment comes into contact with the heat exchangers and thereby the heat exchangers may appropriately and stably operate in the same way as the aforementioned radiator.

However, a flow rate of the air required by each of the heat exchangers is not consistently uniform and the timing when the flow rate of the air changes is not uniform. For example, in a so-called hybrid vehicle driven by driving forces of an engine and a motor, a temperature of an electric power system (for example, an inverter) of the hybrid vehicle tends to suddenly change. Therefore, a flow rate of air brought into contact with a radiator for a hybrid system of the hybrid vehicle may become insufficient. In such case, the known grille shutter device disclosed in Reference 1 may not allow the plural heat exchangers in the hybrid vehicle to stably operate.

A need thus exists for a grille shutter device which is not susceptible to the drawbacks

SUMMARY

A grille shutter device adapted to be arranged at a front portion of a vehicle body, the grille shutter device including a main air inlet taking air to flow the air to a specific heat exchanger arranged in the vehicle body, a shutter mechanism arranged at the main air inlet, the shutter mechanism opening and closing to control a flow rate of the air flowing from the main air inlet to the specific heat exchanger, and a bypass air inlet allowing the air to bypass the shutter mechanism to guide the air to the specific heat exchanger.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
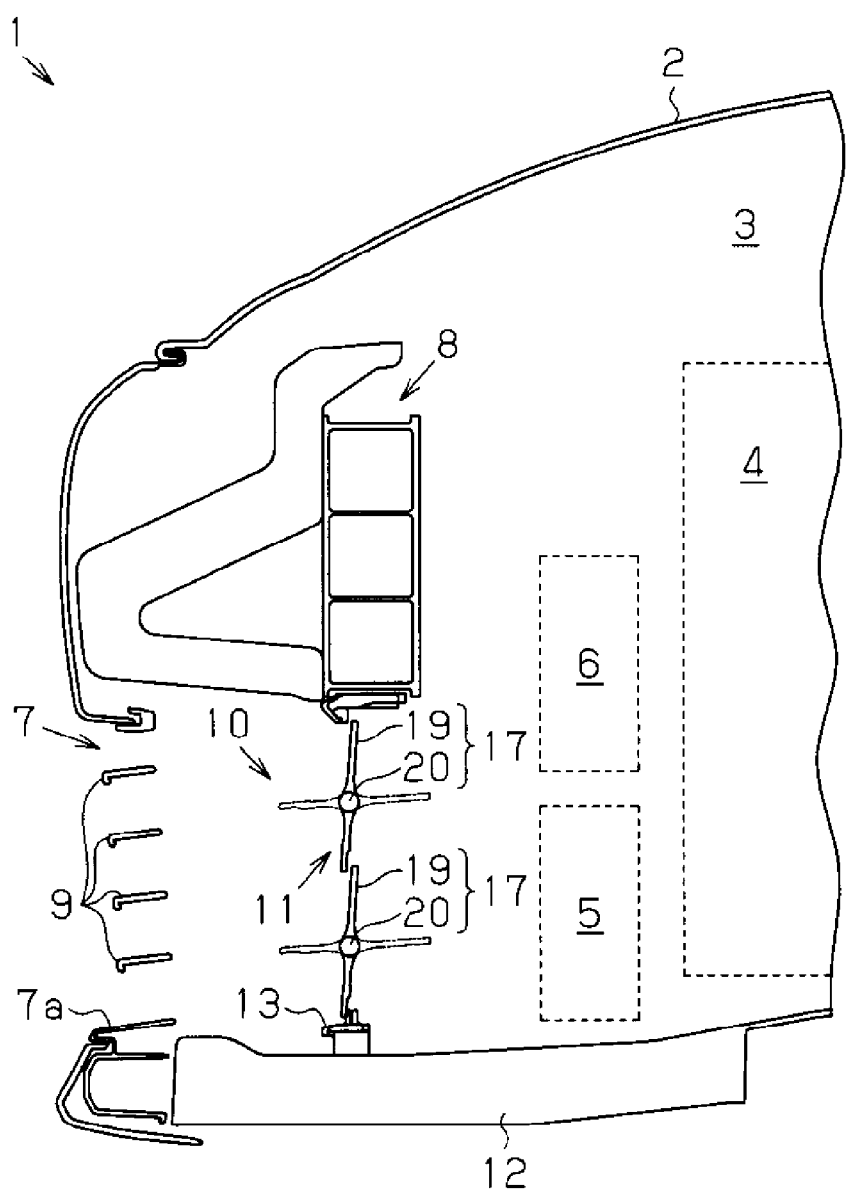
FIG. 1 is a side view schematically illustrating a configuration of a vehicle in which a grille shutter device according to a first embodiment disclosed here is mounted.

[First embodiment] A first embodiment of this disclosure will be explained as follows with reference to the illustrations of the attached drawings. As illustrated in FIG. 1, a radiator 5 serving as a heat exchanger for cooling an engine 4 is accommodated in an engine compartment 3 formed within a vehicle body 2 of a vehicle 1. In the first embodiment, the vehicle 1 is configured as a so-called hybrid vehicle driven by a motor (drive source) depending on running conditions. A radiator 6 serving as a heat exchanger (specific heat exchanger) for cooling a hybrid system (mainly, a power supply system) is accommodated in the engine compartment 3. Hereinafter, the radiator 5 for the engine 4 and the radiator 6 for the hybrid system will be referred to as an engine radiator 5 and a hybrid system radiator 6.

A grille opening portion 7 is formed at a front portion of the vehicle body 2 (an end portion at a left side in FIG. 1). An external space at a front side of the vehicle 1 and an internal space of the vehicle body 2 are connected to each other by the grille opening portion 7. In particular, the grille opening portion 7 is formed at a lower side of a bumper 8. A grille panel 9 configuring a design surface (a lower grille) of the grille opening portion 7 is attached to an opening end 7a of the grille opening portion 7.

The engine radiator 5 and the hybrid system radiator 6 are arranged at a front side of the engine 4 so that air flowing from the grille opening portion 7 to the engine compartment 3 comes into contact with the engine radiator 5 and the hybrid system radiator 6. In particular, each of the engine radiator 5 and the hybrid system radiator 6 that have elongated shapes extending in a width direction of the vehicle body 2 is arranged at an intermediate portion of the engine compartment 3 in a width direction thereof. In addition, the vehicle 1 according to the first embodiment is provided with a grille shutter device 10 that may control or adjust a flow rate of the air flowing from the grille opening portion 7 into the engine compartment 3. The grille shutter device 10 is adapted to be arranged at the front portion of the vehicle body 2.

In particular, the grille shutter device 10 includes a frame 13 and a shutter mechanism 11 arranged within the frame 13 (at a main air inlet 15). The frame 13 is fixed to a lower structure of the vehicle body 2 to thereby configure an air flow passage for the air flowing from the grille opening portion 7. The shutter mechanism 11 opens and closes to control the flow rate of the air from the main air inlet 15 to the hybrid system radiator 6.

Figure 2:
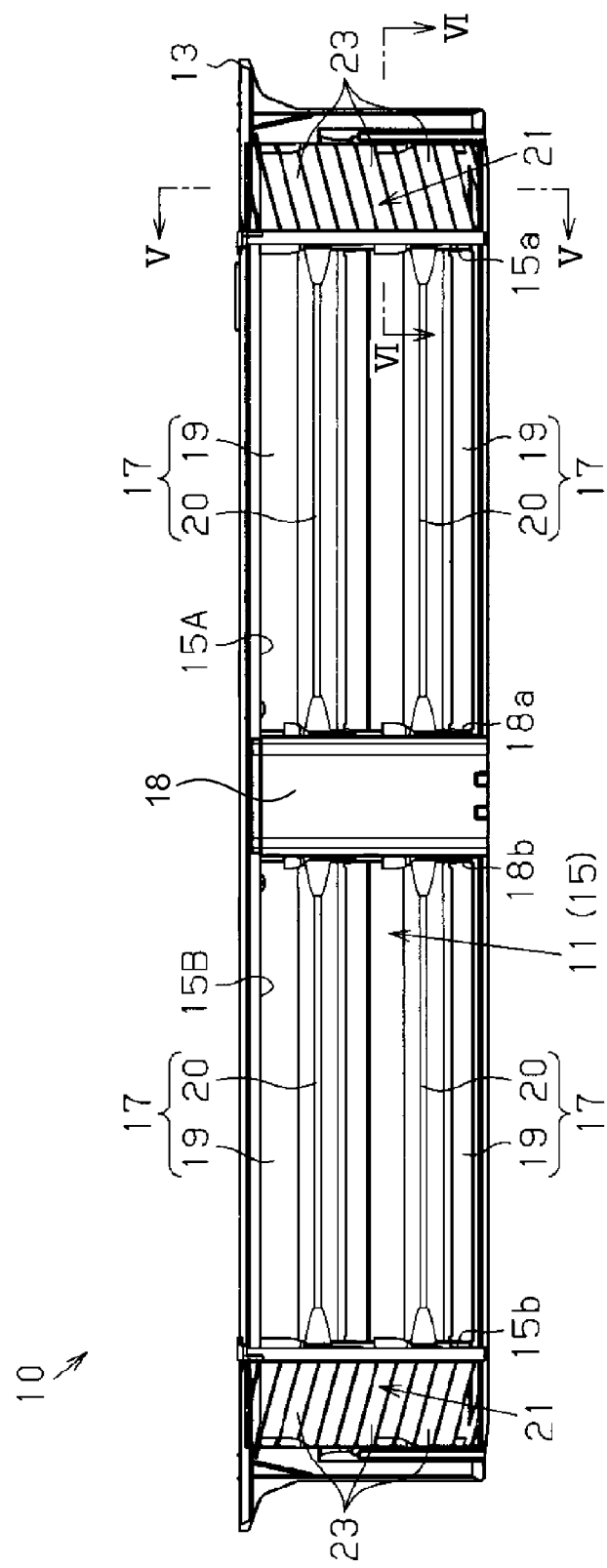
FIG. 2 is a front view of the grille shutter device according to the first embodiment disclosed here.
Figure 3:
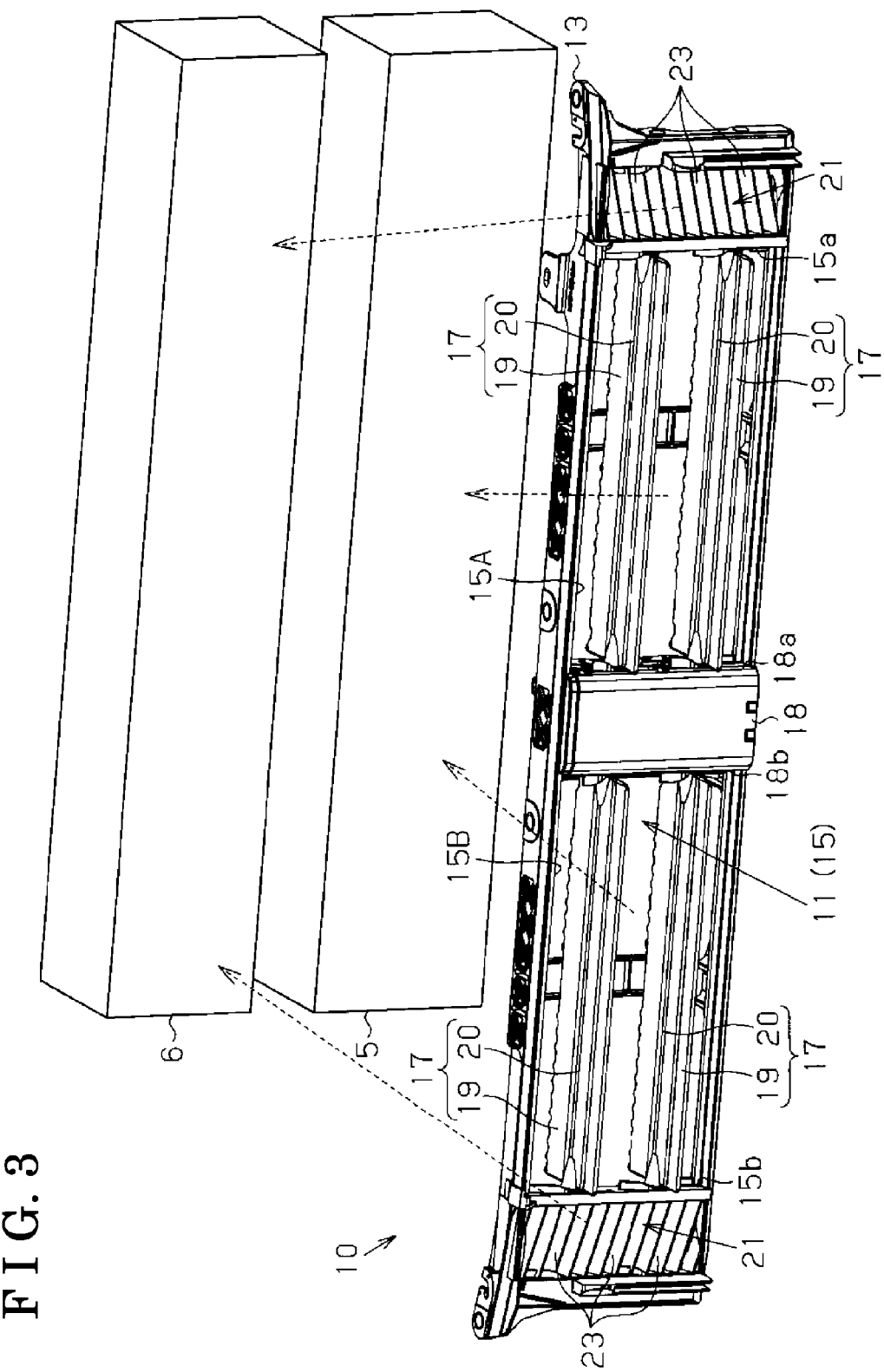
FIG. 3 is a perspective view illustrating a relation between radiators and the grille shutter device according to the first embodiment disclosed here.
Figure 4:
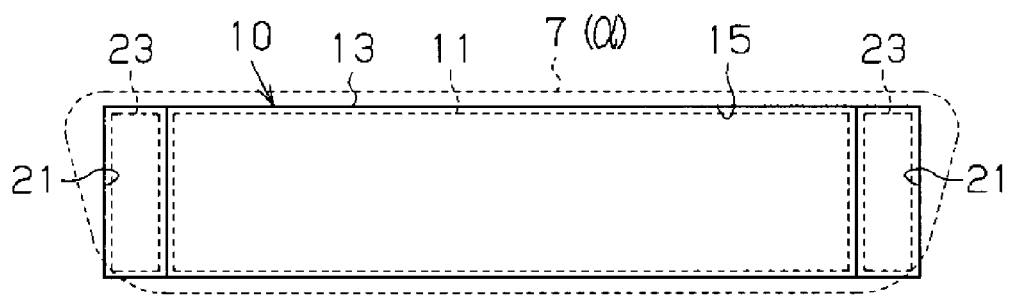
FIG. 4 is a schematic view illustrating a relation between bypass air inlets and a shutter mechanism (a main air inlet) that are arranged at a grille opening portion.

As illustrated in FIGS. 2 to 4, the frame 13 is formed in an elongated shape extending in the width direction of the vehicle body 2 (a right-left direction in each of FIGS. 2 and 4) so as to correspond to an open region α (see FIG. 4) of the grille opening portion 7 opened to a front side of the vehicle body 2. The main air inlet 15 having an elongated shape extending in a longitudinal direction (a width direction) of the frame 13 is formed therewithin. In particular, the main air inlet 15 is formed approximately at an intermediate portion of the frame 13 in the width direction thereof. The shutter mechanism 11 includes multiple movable fins 17 arranged in the main air inlet 15 in an aligned manner, and an actuator 18 driving the movable fins 17.

As illustrated in FIGS. 2 and 3, the actuator 18 having an outer shape formed in a substantially columnar shape is arranged approximately at an intermediate portion of the main air inlet 15 in a width direction thereof. The main air inlet 15 is divided into left and right opening portions 15A and 15B by the actuator 18 (the left and right opening portions 15A and 15B will be hereinafter simply referred to as opening portions 15A and 15B). The movable fins 17 are arranged in two rows at each of the opening portions 15A and 15B.

In particular, the movable fins 17 include fin portions 19 each having a substantially elongated flat shape extending in the width direction of the main air inlet 15, and rotary shafts 20. Here, the actuator 18 includes side surfaces 18a and 18b opposite to each other in the width direction of the main air inlet 15 and the main air inlet 15 includes inner surfaces 15a and 15b at side ends in the width direction. The inner surfaces 15a and 15b face the side surfaces 18a and 18b, respectively, of the actuator 18. The aforementioned rotary shafts 20 are provided so as to extend between the side surface 18a and the inner surface 15a and between the side surface 18b and the inner surface 15b in the width direction of the main air inlet 15. In addition, the actuator 18 drives the rotary shafts 20 to thereby rotate or move the movable fins 17.

According to the grille shutter device 10 of the first embodiment, the movable fins 17 rotate in a direction to bring the fin portions 19 in parallel to a flow direction of the air flowing from the grille opening portion 7 (i.e., the movable fins 17 rotate in a clockwise direction seen in FIG. 1); thereby, the shutter mechanism 11 is brought into an opened state. On the other hand, the movable fins 17 rotate in a direction to bring the fin portions 19 in perpendicular to the flow direction of the air flowing from the grille opening portion 7 (i.e., the movable fins 17 rotate in a counterclockwise direction seen in FIG. 1); thereby, the shutter mechanism 11 is brought into a closed state. In addition, in a state where the movable fins 17 are in a position corresponding to a fully closed state thereof, respective ends (respective fin ends of the fin portions 19) of the movable fins 17 positioned side by side are overlapped with one another; thereby, the main air inlet 15 may be closed.

According to the grille shutter device 10 of the first embodiment, the rotation of the movable fins 17 is controlled by the actuator 18. Thus, the flow rate of the air flowing from the grille opening portion 7 into the engine compartment 3 may be controlled by the opening and closing operations of the shutter mechanism 11 in accordance with the rotation of the movable fins 17.

Further, the grille shutter device 10 includes bypass air inlets 21 that allow the air flowing from the grille opening portion 7 to bypass the shutter mechanism 11 to take the air into the engine compartment 3. According to the first embodiment, the air taken from the bypass air inlets 21 is guided or transmitted to the hybrid system radiator 6; therefore, the hybrid system may be stably cooled by the hybrid system radiator 6 regardless of the operating conditions of the shutter mechanism 11.

In particular, according to the first embodiment, the bypass air inlets 21 are arranged at both lateral sides of the main air inlet 15 within the frame 13 in the width direction of the main air inlet 15 (the bypass air inlets 21 are arranged at a peripheral portion of the shutter mechanism 11). In addition, the hybrid system radiator 6 is arranged at an upper side of the engine radiator 5, in the engine compartment 3. Multiple air guide fins 23 are arranged at each of the bypass air inlets 21. The air taken from the bypass air inlet 21 is guided by the air guide fins 23 to the hybrid system radiator 6.

Figure 5:
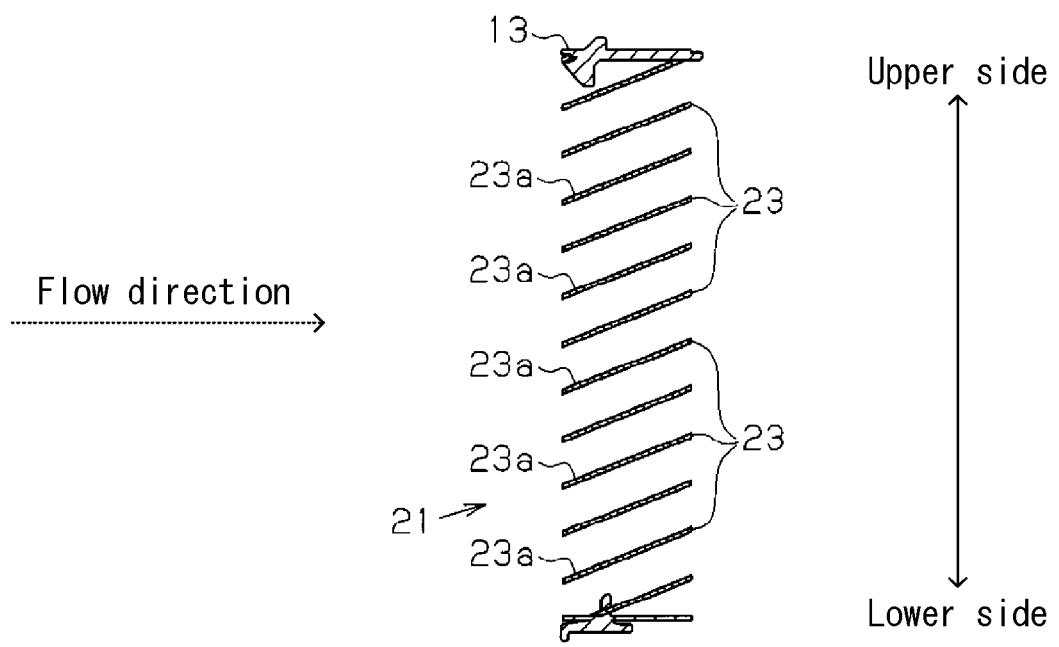
FIG. 5 is a cross sectional view taken along the line V-V of FIG. 2 and illustrating the bypass air inlet and air guide fins according to the first embodiment disclosed here.
Figure 6:
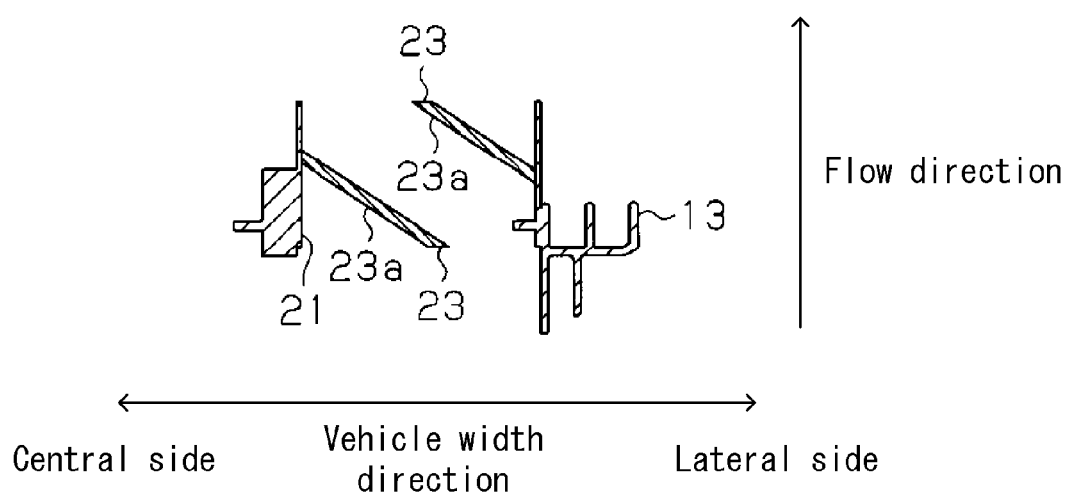
FIG. 6 is a cross sectional view taken along the line VI-VI of FIG. 2 and illustrating the bypass air inlet and the air guide fins according to the first embodiment disclosed here.

As illustrated in FIGS. 5 and 6, each of the air guide fins 23 has an outer shape formed in a substantially flattened plate. In each of the bypass air inlets 21, the air guide fins 23 are arranged and aligned at approximately equal intervals from one another in a vertical direction of the frame 13 (the vehicle body 2). Each of the air guide fins 23 includes a fin surface 23a for controlling a flow of the air flowing from the bypass air inlet 21.

As illustrated in FIG. 5, the fin surface 23a is formed so as to be inclined from a lower side to an upper side in the vertical direction of the vehicle body 2 (the vertical direction corresponds to a vertical direction in FIG. 5) along the flow direction (corresponding to a direction from a left side to a right side in FIG. 5) of the air taken from the bypass air inlet 21. In addition, as illustrated in FIG. 6, the fin surface 23a is formed so as to be inclined from each of lateral sides of the vehicle body 2 in the width direction (corresponding to a right-left direction in FIG. 6) to a central side of the vehicle body 2 in the width direction along the flow direction of the air taken from the bypass air inlet 21.

In other words, the air that has reached the bypass air inlet 21 passes therethrough while flowing along the fin surfaces 23a of the air guide fins 23, respectively. Therefore, the air taken from the bypass air inlets 21 to the engine compartment 3 is guided to the hybrid system radiator 6.

Additionally, the air guide fins 23 are arranged at each of the bypass air inlets 21 in a manner that end portions of the air guide fins 23 are overlapped with one another in the flow direction of the air flowing from the grille opening portion 7 to the bypass air inlet 21, in order to restrict the bypass air inlet 21 from having an open region opened and overlapped with upstream and downstream sides of each of the air guide fins 23 in the flow direction of the air. In other words, the air guide fins 23 are arranged so that the engine compartment 3 is not seen from clearances between the air guide fins 23 when the bypass air inlet 21 is viewed from a direction identical to the flow direction of the air. Thus, according to the first embodiment, the air from the grille opening portion 7 is restricted linearly flowing from the bypass air inlets 21 to the engine compartment 3.

As described above, according to the grille shutter device 10 of the first embodiment, the following effects may be obtained. (1) The grille shutter device 10 is provided with the bypass air inlets 21. Consequently, regardless of the operating conditions of the shutter mechanism 11, the air flowing from the grille opening portion 7 may be stably guided by the bypass air inlets 21 to the hybrid system radiator 6. As a result, an effect of the control for the flow rate of the air in accordance with the opening and closing operations of the shutter mechanism 11 (i.e., for example, an improvement of aerodynamic performance of the vehicle 1) may be ensured and the hybrid system radiator 6 at which the flow rate of the air required for thermal exchange significantly fluctuates (i.e., a temperature tends to drastically rise) may be restricted from unstably functioning.

(2) According to the first embodiment, the position of the shutter mechanism 11 in the grille opening portion 7 (at the main air inlet 15) is determined in consideration of the effect of the control for the flow rate of the air by the shutter mechanism 11. In addition, the bypass air inlets 21 are applied to the grille shutter device 10; therefore, the effect of the control for the flow rate of the air by means of the shutter mechanism 11 may deteriorate. According to the first embodiment, the bypass air inlets 21 are arranged at the peripheral portion of the shutter mechanism 11, thereby restricting the deterioration of the effect of the control for the flow rate of the air by means of the shutter mechanism 11.

For example, in a case where the improvement of the aerodynamic performance is taken into consideration, it is appropriate for the shutter mechanism 11 to be arranged at a portion in which the air flows at the maximum rate. Accordingly, in the first embodiment, the shutter mechanism 11 is arranged at an intermediate portion of the open region α in a width direction of the grille opening portion 7 opened to the front side of the vehicle body 2 (see FIG. 4). In other words, the frame 13 having the shape corresponding to the open region α is arranged at the grille opening portion 7 and the shutter mechanism 11 is arranged at the main air inlet 15 formed approximately at the intermediate portion of the frame 13 in the width direction thereof. In addition, the bypass air inlets 21 are arranged at the lateral sides of the main air inlet 15 in the width direction thereof. As a result, the air flowing from the grille opening portion 7 may be effectively taken into the engine compartment 3 while the aerodynamic performance of the vehicle 1 is restricted from deteriorating.

(3) In particular, various devices or equipments, for example, the engine 4 and auxiliary machineries for the engine 4 are arranged at the intermediate portion of the engine compartment 3 in the width direction thereof. Therefore, in a case where air is taken from portions of lateral sides of the grille opening portion 7 in the width direction to the engine compartment 3, a turbulence flow of the air is unlikely to occur compared to a case where air is taken from the intermediate portion of the grille opening portion 7 in the width direction. Consequently, the bypass air inlets 21 are arranged at lateral sides of the shutter mechanism 11 in a width direction thereof (in the width direction of the vehicle body 2) as described in the first embodiment; thereby, the deterioration of the aerodynamic performance of the vehicle 1 may be further effectively restricted.

In addition, the heat exchangers (the engine radiator 5 and the hybrid system radiator 6), for example, utilized in a large vehicle generally have the elongated shapes extending in the width direction of the vehicle body 2. Therefore, the plural heat exchangers (the engine radiator 5 and the hybrid system radiator 6) tend to be arranged vertically to one another in the engine compartment 3. According to the aforementioned configuration of the grille shutter device 10 of the first embodiment, the air taken from the bypass air inlets 21 at the shutter mechanism 11 may be guided to any of the heat exchangers arranged at upper and lower sides in the engine compartment 3. For example, in a case where the hybrid system radiator 6 is arranged in a vehicle in the reverse direction to the arrangement of the hybrid system radiator 6 arranged in the vehicle 1 according to the first embodiment, i.e., in a case where the hybrid system radiator 6 is arranged at a lower side of the engine radiator 5 in the vehicle, only small changes are applied to the grille shutter device 10; thereby, the grille shutter device 10 of the first embodiment may be easily applied to the vehicle where the hybrid system radiator 6 is arranged at the lower side of the engine radiator 5. As a result, the grille shutter device 10 of the first embodiment may be mounted to different types of vehicles.

(4) According to the first embodiment, the multiple air guide fins 23 are simply configured to be arranged at each of the bypass air inlets 21; thereby, the air taken from the bypass air inlets 21 is guided to the hybrid system radiator 6. In addition, specifications, for example, the arrangement, shape, and the like of each of the air guide fins 23 are modified; thereby, a direction to guide the air from the bypass air inlets 21 to the engine compartment 3 may be changed. As a result, the grille shutter device 10 of the first embodiment may be easily and simply applied to the aforementioned vehicle where the hybrid system radiator 6 is arranged in the reverse direction to the arrangement of the hybrid system radiator 6 arranged in the vehicle 1 according to the first embodiment.

(5) According to the first embodiment, the air guide fins 23 are arranged at each of the bypass air inlets 21 in a manner that the end portions of the air guide fins 23 are overlapped with one another in the flow direction of the air flowing from the grille opening portion 7 to the bypass air inlet 21, in order to restrict the bypass air inlet 21 from having the open region opened and overlapped with the upstream and downstream sides of each of the air guide fins 23 in the flow direction of the air. Therefore, the air taken from the grille opening portion 7 may be restricted from linearly flowing through the bypass air inlets 21 to the engine compartment 3. As a result, the flow rate of the air taken from the bypass air inlets 21 to the engine compartment 3 may be appropriately controlled or adjusted to therefore restrict the deterioration of the aerodynamic performance of the vehicle 1.

[Second embodiment] A second embodiment of the disclosure will be explained as follows with reference to the illustrations of the attached drawings. In the second embodiment, the same numbers will be assigned to configurations similar to those of the first embodiment and detailed explanations of the configurations similar to those of the first embodiment will be hereinafter omitted.

Figure 7:
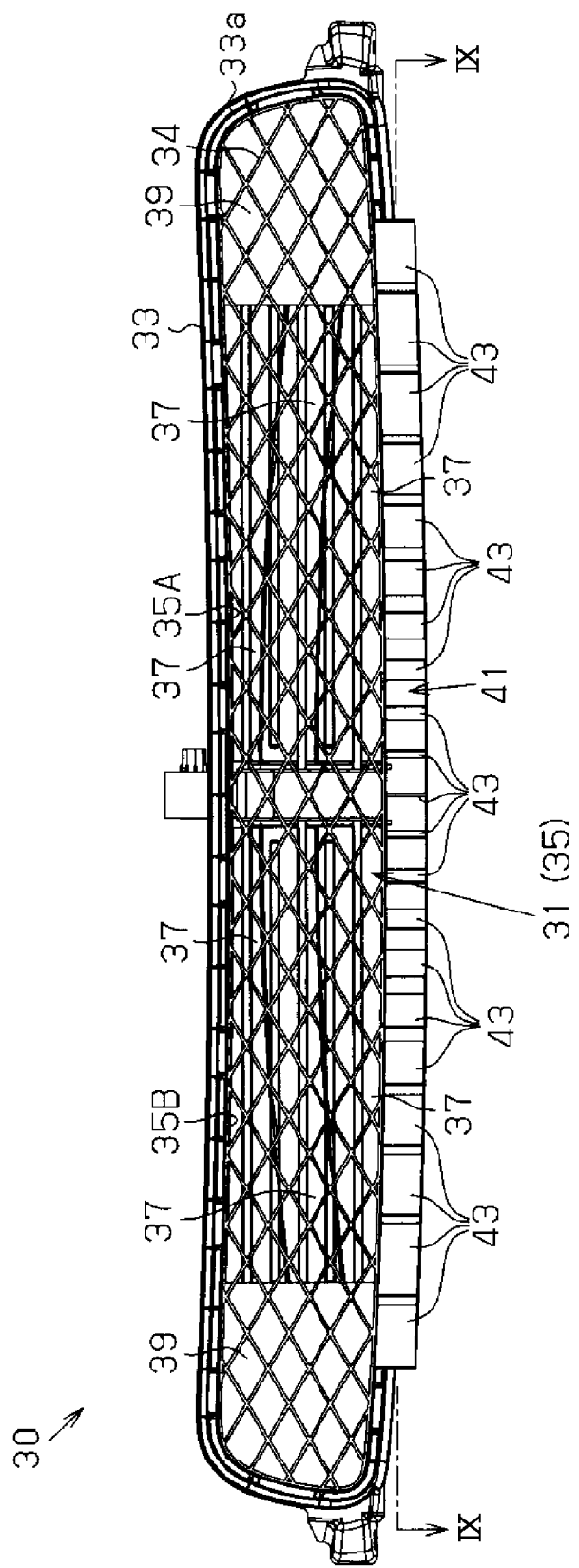
FIG. 7 is a front view of the grille shutter device according to a second embodiment disclosed here.
Figure 8:
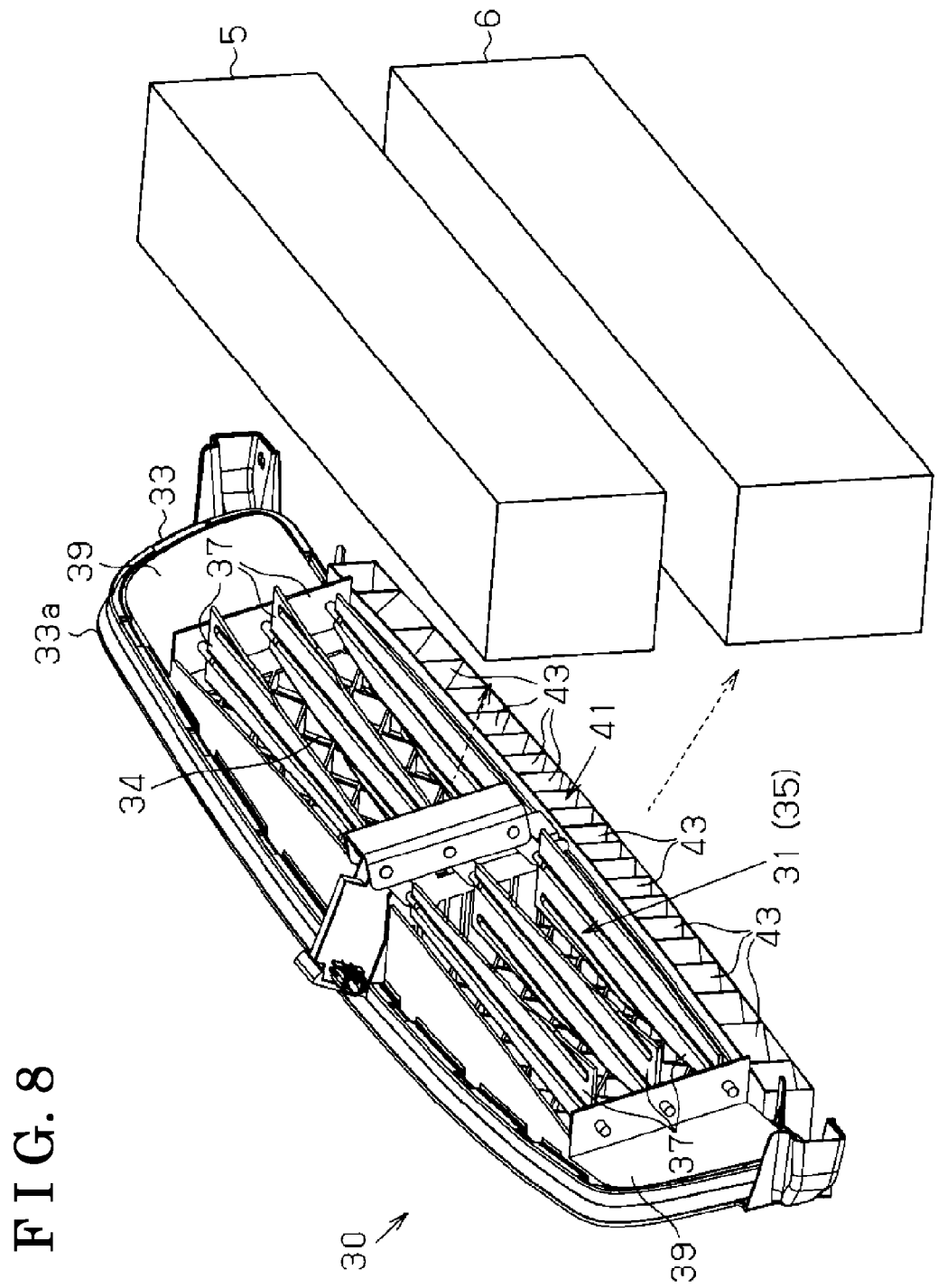
FIG. 8 is a perspective view illustrating a relation between the radiators and the grille shutter device according to the second embodiment disclosed here.

As illustrated in FIGS. 7 and 8, a grille shutter device 30 according to the second embodiment includes a frame 33 and a grille panel 34. The grille panel 34 is integrally formed with a front surface 33a of the frame 33. In particular, the grille shutter device 30 is attached to the opening end 7a of the grille opening portion 7 (see FIG. 1). Movable fins 37 are arranged in three rows at each of left and right opening portions 35A and 35B (which will be hereinafter simply referred to as opening portions 35A and 35B). The opening portions 35A and 35B configure a main air inlet 35. A shutter mechanism 31 included in the grille shutter device 30 according to the second embodiment performs opening and closing operations in accordance with rotation of the movable fins 37 in a similar way to the shutter mechanism 11 of the grille shutter device 10 according to the first embodiment.

According to the second embodiment, the shutter mechanism 31 is arranged at the main air inlet 35. Portions at both lateral sides of the main air inlet 35 in a width direction thereof are closed by cover panels 39 and therefore correspond to non-opening portions. In addition, a bypass air inlet 41 is arranged at a lower side of the frame 33 (the bypass air inlet 41 is arranged at a peripheral portion of the shutter mechanism 31).

In the vehicle 1 to which the grille shutter device 30 of the second embodiment is mounted, the hybrid system radiator 6 is arranged at the lower side of the engine radiator 5. The bypass air inlet 41 is provided at a position corresponding to the hybrid system radiator 6.

In particular, the bypass air inlet 41 has an elongated frame shape extending in a width direction (a right-left direction in FIG. 7) of the frame 33, i.e., in the width direction of the vehicle body 2. Multiple air guide fins 43 are arranged at the bypass air inlet 41.

Figure 9:
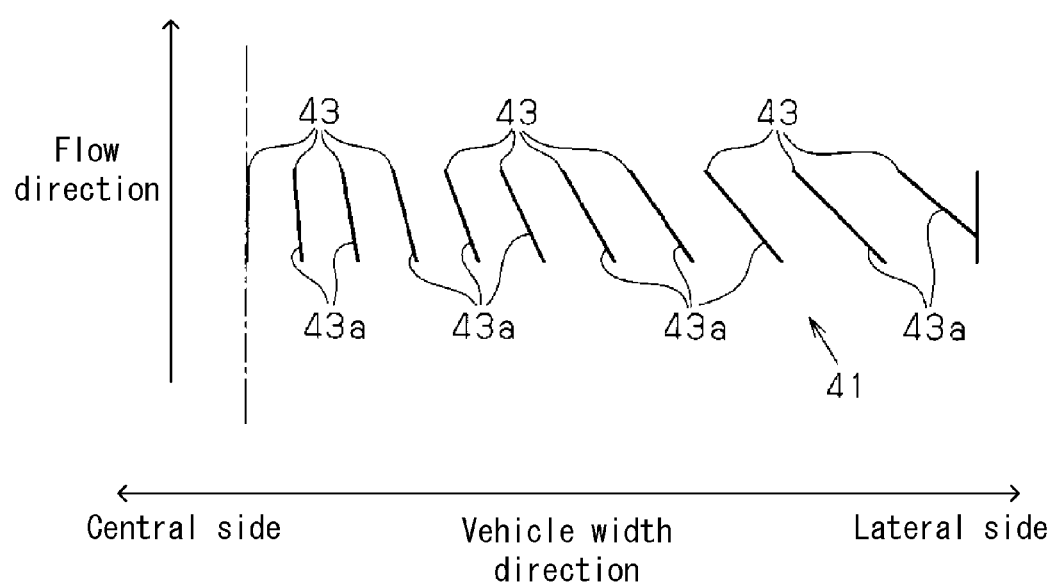
FIG. 9 is a cross sectional view taken along the line IX-IX of FIG. 7 and illustrating the bypass air inlet and the air guide fins according to the second embodiment disclosed here.

According to the second embodiment, the air guide fins 43 are arranged at the bypass air inlet 41 so as to be aligned along a width direction thereof. In addition, as illustrated in FIG. 9, each of the air guide fins 43 includes a fin surface 43a. The fin surface 43a is formed so as to be inclined from each of the lateral sides to the central side in the width direction of the vehicle body 2 (in a right-left direction in FIG. 9) along a flow direction (a direction from a lower side to an upper side in FIG. 9) of air flowing in the bypass air inlet 41. Moreover, according to the second embodiment, the further the air guide fin 43 is located away from an intermediate portion of the bypass air inlet 41 in the width direction thereof (i.e., the further the air guide fin 43 is located away from the central side in the width direction of the vehicle body 2), the larger the inclination of the fin surface 43a of the air guide fin 43 is.

In other words, the air that has reached the bypass air inlet 41 passes therethrough while flowing along the fin surfaces 43a of the air guide fins 43, respectively. Therefore, the air taken from the bypass air inlet 41 may be effectively guided to the hybrid system radiator 6.

As described above, the grille shutter device 30 according to the second embodiment is applied; thereby, effects similar to those of the grille shutter device 10 according to the first embodiment may be obtained. In the grille shutter device 30 according to the second embodiment, the bypass air inlet 41 is positioned further adjacent to the hybrid system radiator 6 serving as the specific heat exchanger for the hybrid system. Therefore, the air taken from the bypass air inlet 41 may be effectively guided to the hybrid system radiator 6.

Moreover, as described above, according to the grille shutter device 30 of the second embodiment, the further the air guide fin 43 is located away from the intermediate portion of the bypass air inlet 41 in the width direction thereof, the larger the inclination of the fin surface 43a of the air guide fin 43 is. Thus, the air guided by the bypass air inlet 41 may converge on an intermediate portion of the hybrid system radiator 6 in a width direction thereof. As a result, the hybrid system radiator 6 may further effectively function.

In addition, the aforementioned first and second embodiments may be modified as follows. According to the first and second embodiments, the grille shutter device 10, 30 is applied to the vehicle 1 provided with the engine radiator 5 and the hybrid system radiator 6. In addition, the grille shutter device 10, 30 is provided with the bypass air inlet 21, 41 that allows the air flowing from the grille opening portion 7 to bypass the shutter mechanism 11, 31 to take the air into the engine compartment 3 to guide the air to the hybrid system radiator 6 serving as the specific heat exchanger.

As described above, according to the aforementioned first and second embodiments, the hybrid system radiator 6 corresponds to the specific heat exchanger. Alternatively, in a vehicle including a vehicle body in which plural heat exchangers are arranged, any of the plural heat exchangers may be applied as the specific heat exchanger. In such case, it is appropriate for the grille shutter device 10, 30 to be adapted to be provided with a bypass air inlet that allows air from a grille opening portion to bypass a shutter mechanism to take the air into the vehicle body to guide the air to the specific heat exchanger. In other words, a heat exchanger other than the hybrid system radiator 6 may be applied as the specific heat exchanger. Alternatively, regardless of types of the aforementioned plural heat exchangers, the plural heat exchangers may be applied as the specific heat exchangers.

According to the aforementioned first and second embodiments, the engine radiator 5 and the hybrid system radiator 6 are arranged in the engine compartment 3. Alternatively, the engine radiator 5 and the hybrid system radiator 6 each serving as the heat exchanger may be arranged in the internal space of the vehicle body 2. In other words, it is appropriate for the heat exchanger to be arranged in the internal space that is contactable with the air taken from the grille opening portion 7. That is, the heat exchanger may be applied, for example, to an electric vehicle or a vehicle where an engine is arranged in a rear or central portion of a vehicle body.

According to the aforementioned first and second embodiments, the multiple air guide fins 23, 43 are arranged at the bypass air inlet 21, 41; thereby, the air taken from the bypass air inlet 21, 41 to the engine compartment 3 is guided to the hybrid system radiator 6 (the specific heat exchanger). Alternatively, an air guide passage (a duct) for guiding the air taken from the bypass air inlet 21, 41 to the hybrid system radiator 6 may be formed at a rear side of the bypass air inlet 21, 41.

Further, according to the aforementioned first and second embodiments, the air taken from the bypass air inlet 21, 41 to the engine compartment 3 is guided to the hybrid system radiator 6 by the inclinations of the fin surfaces 23a, 43a of the air guide fins 23, 43, respectively. Alternatively, protrusions or recessed portions may be formed at inner wall surfaces of the air guide fins 23, 43, respectively, in order to control the flow direction of the air taken from the bypass air inlet 21, 41.

According to the aforementioned first and second embodiments, the opening and closing operations of the shutter mechanism 11, 31 are performed by the rotation of the movable fins 17, 37 that are so-called rotary members. Alternatively, the shutter mechanism 11, 31 may be configured to be provided, for example, with a slidable member or a movable member that swings or oscillates.

According to the aforementioned first embodiment, the actuator 18 is arranged approximately at the intermediate portion of the main air inlet 15 in the width direction thereof and the main air inlet 15 is partitioned by the actuator 18 into the opening portions 15A and 15B. In addition, the movable fins 17 are arranged in two rows at each of the opening portions 15A and 15B. According to the aforementioned second embodiment, the movable fins 37 are arranged in three rows at each of the opening portions 35A and 35B that configure the main air inlet 35. Alternatively, the actuator 18 may be arranged in a different manner from the arrangement described in the first embodiment. Further, the movable fins 17, 37 may be arranged in a different manner from the arrangement described in each of the first and second embodiments. For example, the actuator 18 may be arranged at the side end of the main air inlet 15 in the width direction thereof.

Moreover, the number of movable fins 17, 37 or the arrangement of the movable fins 17, 37 may be modified as follows. For example, the movable fins 17, 37 may be configured to include rotary shafts extending in a vertical direction of the main air inlet 15, 35 and are thereby aligned along the vertical direction.

According to the aforementioned first embodiment, the bypass air inlets 21 are arranged at the lateral sides of the main air inlet 15 at which the shutter mechanism 11 is provided. According to the aforementioned second embodiment, the bypass air inlet 41 is arranged at a lower side of the main air inlet 35 at which the shutter mechanism 31 is provided. Alternatively, in a case where a grille shutter device is mounted to a vehicle in which the hybrid system radiator 6 is arranged at the upper side of the engine radiator 5 as in the first embodiment, a bypass air inlet may be arranged at an upper side of a main air inlet. Further alternatively, the bypass air inlet may be arranged at either one of lateral sides of the main air inlet in a width direction thereof. In addition, plural bypass air inlets may be provided arbitrarily in plural positions in a vertical direction of the main air inlet and in the width direction of the main air inlet. In other words, it is appropriate for each of the plural bypass air inlets to be arranged at a peripheral portion of the main air inlet. The bypass air inlets may be arbitrarily arranged in any positions of the peripheral portion of the main air inlet. Such arrangement of the bypass air inlets does not deny a configuration where the bypass air inlets are positioned away from a shutter mechanism. Even such configuration where the bypass air inlets are positioned away from the shutter mechanism may achieve a certain level of effect.

According to the aforementioned first embodiment, the air guide fins 23 are arranged at each of the bypass air inlets 21 in a manner that the end portions of the air guide fins 23 are overlapped with one another in the flow direction of the air flowing from the grille opening portion 7 to the bypass air inlet 21, in order to restrict the bypass air inlet 21 from having the open region opened and overlapped with the upstream and downstream sides of each of the air guide fins 23 in the flow direction of the air. Alternatively, the bypass air inlet 21 may be configured to have an open region overlapped with the upstream and downstream sides of each of the air guide fins 23 in the flow direction of the air. In other words, the air guide fins 23 may be arranged so that the engine compartment 3 is seen from the clearances between the air guide fins 23 when the bypass air inlet 21 is viewed from the direction identical to the flow direction of the air.

As described above, according to the aforementioned embodiments, the grille shutter device 10, 30 is adapted to be arranged at the front portion of the vehicle body 2. The grille shutter device 10, 30 includes the main air inlet 15, 35 taking the air to flow the air to the hybrid system radiator 6 arranged in the vehicle body 2, the shutter mechanism 11, 31 arranged at the main air inlet 15, 35, the shutter mechanism 11, 31 opening and closing to control the flow rate of the air flowing from the main air inlet 15, 35 to the hybrid system radiator 6, and the bypass air inlet 21, 41 allowing the air to bypass the shutter mechanism 11, 31 to guide the air to the hybrid system radiator 6.

According to the aforementioned configuration of the grille shutter device 10, 30, the air flowing from the main air inlet 15, 35 may be stably guided to the hybrid system radiator 6 regardless of the operating conditions of the shutter mechanism 11, 31. As a result, the hybrid system radiator 6 may stably function while the effect of the control for the flow rate of the air by means of the shutter mechanism 11, 31 (i.e., for example, the improvement of the aerodynamic performance) may be ensured. For example, the flow rate of the air required by the hybrid system radiator 6 tends to significantly fluctuate depending on driving conditions of the vehicle 1. According to the grille shutter device 10, 30 of the aforementioned embodiments, the air from the main air inlet 15, 35 the grille opening portion 7 is effectively brought into contact with the hybrid system radiator 6 corresponding to the specific heat exchanger. As a result, the hybrid system radiator 6 may appropriately or stably function.

According to the aforementioned embodiments, the grille shutter device 10, 30 further includes the frame 13, 33 forming the main air inlet 15, 35 and the bypass air inlet 21, 41 and supporting the shutter mechanism 11, 31.

According to the aforementioned embodiments, the bypass air inlet 21, 41 is arranged at the peripheral portion of the shutter mechanism 11, 31.

Thus, the position of the shutter mechanism 11, 31 at the main air inlet 15, 35 is determined in consideration of the effect of the control for the flow rate of the air by the shutter mechanism 11, 31. In addition, the bypass air inlet 21, 41 is applied to the grille shutter device 10, 30; therefore, the effect of the control for the flow rate of the air by means of the shutter mechanism 11, 31 may deteriorate. According to the aforementioned embodiments, the bypass air inlet 21, 41 is arranged at the peripheral portion of the shutter mechanism 11, 31. As a result, the air flowing from the main air inlet 15, 35 may be effectively taken into the vehicle body 2 while the deterioration of the effect of the control for the flow rate of the air by means of the shutter mechanism 11, 31 may be restricted.

For example, in a case where the improvement of the aerodynamic performance is taken into consideration, it is appropriate for the shutter mechanism 11, 31 to be arranged at a portion in which the air flows at the maximum rate. Accordingly, according to the aforementioned first embodiment, the shutter mechanism 11 is arranged at the intermediate portion of the open region α in the width direction of the grille opening portion 7 opened to the front side of the vehicle body 2. Consequently, the air flowing from the grille opening portion 7 (the main air inlet 15, 35) may be effectively taken into the vehicle body 2 while the aerodynamic performance may be restricted from deteriorating.

According to the aforementioned first embodiment, the bypass air inlets 21 are arranged at the lateral sides of the shutter mechanism 11 in the width direction of the vehicle body 2.

The heat exchangers, for example, the engine radiator 5 and the hybrid system radiator 6 utilized in a large vehicle generally have the elongated shapes extending in a width direction of a vehicle body of the large vehicle. Therefore, in a case where the plural heat exchangers (the engine radiator 5 and the hybrid system radiator 6) are accommodated in the vehicle body, the plural heat exchangers tend to be arranged vertically to one another in the large vehicle. Even in such case, according to the aforementioned configuration of the grille shutter device 10 of the first embodiment, the air taken from the bypass air inlets 21 may be guided to any of the heat exchangers vertically arranged in the large vehicle. As a result, the grille shutter device 10 of the first embodiment may be mounted to different types of vehicles.

In addition, the various devices or equipments, for example, the engine 4 and the auxiliary machineries for the engine 4 are arranged at the intermediate portion of the engine compartment 3 in the width direction thereof. Therefore, in a case where air is taken from the portions of the lateral sides of the grille opening portion 7 in the width direction to the engine compartment 3, a turbulence flow of the air is unlikely to occur compared to a case where air is taken from the intermediate portion of the grille opening portion 7 in the width direction. Consequently, according to the arrangement of the bypass air inlets 21, the deterioration of the aerodynamic performance of the vehicle 1 may be further effectively restricted.

According to the aforementioned second embodiment, the bypass air inlet 41 is at at least any of the upper and lower sides of the shutter mechanism 31.

According to the aforementioned embodiments, the bypass air inlets 21, 41 are at the lateral side of the shutter mechanism 11, 31 and at least any of the upper and lower sides of the shutter mechanism 11, 31.

According to the aforementioned configuration, the bypass air inlet 41 is positioned further adjacent to the hybrid system radiator 6 serving as the specific heat exchanger. Therefore, the air taken from the bypass air inlet 41 may be effectively guided to the hybrid system radiator 6. In addition, the air guided by the bypass air inlet 41 may converge on the intermediate portion of the hybrid system radiator 6 in the width direction thereof. As a result, the hybrid system radiator 6 may further effectively function.

According to the aforementioned embodiments, the air guide fin 23, 43 guiding the air to the hybrid system radiator 6 is provided at the bypass air inlet 21, 41.

Accordingly, the air taken from the bypass air inlet 21, 41 is guided by the aforementioned simple configuration to the hybrid system radiator 6. In addition, specifications, for example, the arrangement, the shape, and the like of the air guide fin 23, 43 are modified; thereby, the direction to guide the air from the bypass air inlet 21, 41 to the vehicle body 2 may be changed. As a result, the grille shutter device 10, 30 of the aforementioned embodiments may be easily and simply applied to various types of vehicles having different arrangements of heat exchangers.

According to the aforementioned first embodiment, the air guide fin 23 includes the plural air guide fins 23. The plural air guide fins 23 are arranged so that end portions of the air guide fins 23 are overlapped with one another in the flow direction of the air flowing in the bypass air inlet 21, in order to restrict the bypass air inlet 21 from including the open region opened and overlapped with the upstream and downstream sides of each of the air guide fins 23 in the flow direction of the air.

According to the aforementioned configuration, the air from the grille opening portion 7 is restricted from linearly flowing from the bypass air inlets 21 to the engine compartment 3.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A grille shutter device adapted to be arranged at a front portion of a vehicle body, the grille shutter device comprising:
a frame fixable to a lower structure of the vehicle body, the frame configuring an air flow passage for the air flowing from a grille opening portion which is formed at the front portion of the vehicle body;
a main air inlet formed at the frame, the main air inlet taking air to flow the air to a specific heat exchanger arranged in the vehicle body;
a shutter mechanism arranged at the main air inlet, the shutter mechanism opening and closing to control a flow rate of the air flowing from the main air inlet to the specific heat exchanger; and
a bypass air inlet formed at the frame, the bypass air inlet allowing the air to bypass the shutter mechanism to guide the air to the specific heat exchanger.

2. The grille shutter device according to claim 1, wherein the frame supports the shutter mechanism.

3. The grille shutter device according to claim 2, wherein the bypass air inlet is arranged at a peripheral portion of the shutter mechanism.

4. The grille shutter device according to claim 3, wherein the bypass air inlet is arranged at a lateral side of the shutter mechanism in a width direction of the vehicle body.

5. The grille shutter device according to claim 4, wherein the bypass air inlet is at the lateral side of the shutter mechanism and at at least any of upper and lower sides of the shutter mechanism.

6. The grille shutter device according to claim 3, wherein the bypass air inlet is at at least any of upper and lower sides of the shutter mechanism.

7. The grille shutter device according to claim 1, wherein the bypass air inlet is arranged at a peripheral portion of the shutter mechanism.

8. The grille shutter device according to claim 7, wherein the bypass air inlet is arranged at a lateral side of the shutter mechanism in a width direction of the vehicle body.

9. The grille shutter device according to claim 8, wherein the bypass air inlet is at the lateral side of the shutter mechanism and at at least any of upper and lower sides of the shutter mechanism.

10. The grille shutter device according to claim 9, wherein an air guide fin guiding the air to the specific heat exchanger is provided at the bypass air inlet.

11. The grille shutter device according to claim 8, wherein an air guide fin guiding the air to the specific heat exchanger is provided at the bypass air inlet.

12. The grille shutter device according to claim 7, wherein the bypass air inlet is at at least any of upper and lower sides of the shutter mechanism.

13. The grille shutter device according to claim 12, wherein an air guide fin guiding the air to the specific heat exchanger is provided at the bypass air inlet.

14. The grille shutter device according to claim 7, wherein an air guide fin guiding the air to the specific heat exchanger is provided at the bypass air inlet.

15. The grille shutter device according to claim 2, wherein an air guide fin guiding the air to the specific heat exchanger is provided at the bypass air inlet.

16. The grille shutter device according to claim 1, wherein an air guide fin guiding the air to the specific heat exchanger is provided at the bypass air inlet.

17. The grille shutter device according to claim 16, wherein the air guide fin includes a plurality of air guide fins, and the plurality of air guide fins is arranged so that end portions of the air guide fins are overlapped with one another in a flow direction of the air flowing in the bypass air inlet, in order to restrict the bypass air inlet from including an open region opened and overlapped with upstream and downstream sides of each of the air guide fins in the flow direction of the air.

18. A grille shutter device comprising:
a frame fixed to a lower structure of a vehicle body which has a grille opening portion, the frame including an air flow passage through which air flows from the grille opening portion toward an engine compartment in the vehicle body;

a main air inlet formed at the frame and configured to guide the air to a specific heat exchanger arranged in the vehicle body;

a shutter mechanism arranged at the main air inlet, the shutter mechanism being operable during opening and closing operations to open and close the main air inlet to control a flow rate of the air flowing from the main air inlet to the specific heat exchanger; and a bypass air inlet formed at the frame, the bypass air inlet allowing air to bypass the shutter mechanism to guide air to the specific heat exchanger to cool the specific heat exchanger independent of the opening and closing operations of the shutter mechanism.

* * * * *